United States Patent
Pignataro et al.

(10) Patent No.: US 8,345,682 B2
(45) Date of Patent: Jan. 1, 2013

(54) DATA PATH PROCESSING INFORMATION INCLUDED IN THE PSEUDOWIRE LAYER OF PACKETS

(75) Inventors: Carlos M. Pignataro, Raleigh, NC (US); Stewart Frederick Bryant, Merstham (GB); Jim Guichard, New Boston, NH (US); David Delano Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 192 days.

(21) Appl. No.: 12/883,080

(22) Filed: Sep. 15, 2010

(65) Prior Publication Data

US 2012/0063450 A1    Mar. 15, 2012

(51) Int. Cl.
*H04L 12/28* (2006.01)
*H04L 12/56* (2006.01)

(52) U.S. Cl. .................................. 370/389; 370/392
(58) Field of Classification Search .............. 370/392, 370/351, 352
See application file for complete search history.

(56) References Cited

U.S. PATENT DOCUMENTS

| | | | |
|---|---|---|---|
| 7,516,224 B2 | 4/2009 | Guichard et al. | |
| 7,782,841 B2* | 8/2010 | Rampal et al. | 370/352 |
| 7,848,323 B2* | 12/2010 | He | 370/389 |
| 7,860,100 B2 | 12/2010 | Khalid et al. | |
| 8,023,505 B2* | 9/2011 | Gerosa et al. | 370/389 |
| 8,184,634 B2* | 5/2012 | Nonaka | 370/392 |
| 2007/0237147 A1 | 10/2007 | Quinn et al. | |
| 2008/0177896 A1 | 7/2008 | Quinn et al. | |
| 2008/0198849 A1 | 8/2008 | Guichard et al. | |
| 2008/0320303 A1 | 12/2008 | Khalid et al. | |
| 2009/0037713 A1 | 2/2009 | Khalid et al. | |
| 2010/0058329 A1 | 3/2010 | Durazzo et al. | |
| 2010/0165985 A1 | 7/2010 | Sharma et al. | |
| 2010/0254385 A1 | 10/2010 | Sharma et al. | |
| 2012/0002672 A1 | 1/2012 | Alexander, Jr. et al. | |
| 2012/0026897 A1 | 2/2012 | Guichard et al. | |
| 2012/0027016 A1 | 2/2012 | Filsfils et al. | |
| 2012/0033663 A1 | 2/2012 | Guichard et al. | |
| 2012/0033664 A1 | 2/2012 | Pignataro et al. | |
| 2012/0120952 A1* | 5/2012 | Jalan et al. | 370/390 |

OTHER PUBLICATIONS

L. Martini et al., "Pseudowire Setup and Maintenance Using the Label Distribution Protocol (LDP)", RFC 4447, Apr. 2006.*
Bryant et al., "Protocol Layering in PWE3", Internet Draft, May 2002.*
Bryant et al., "Pseudo Wire Emulation Edge-to-Edge (PWE3) Architecture", RFC 3985, Mar. 2005.*

* cited by examiner

*Primary Examiner* — Ayaz Sheikh
*Assistant Examiner* — Blanche Wong
(74) *Attorney, Agent, or Firm* — The Law Office of Kirk D. Williams

(57) ABSTRACT

Data path processing information is included in the pseudowire layer of pseudowire packets in order to provide information for use in the data path processing of data (e.g., a packet), typically, but not always, included in the payload of the pseudowire packet itself. The pseudowire packet typically includes in corresponding fields: a pseudowire label for identifying a pseudowire type; a pseudowire control word; and payload data. The pseudowire type identifies the structure of the pseudowire control word field and the payload field, including the location of data path meta data, such as in the pseudowire control word field or payload field. This data path meta data identifies one or more attributes for use in processing the payload data.

20 Claims, 14 Drawing Sheets

DATA PATH PROCESSING INFORMATION INCLUDED IN THE PSEUDOWIRE LAYER OF PACKETS

TECHNICAL FIELD

The present disclosure relates generally to communicating information in a network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Layer-4 to layer-7 services are often applied to packets being sent through a packet switching device. Service Insertion Architecture teaches one approach to providing network services outside the packet switching device. Additionally, pseudowires are used in a network to emulate a layer 2 point-to-point connection-oriented service in a packet switching network.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1A:
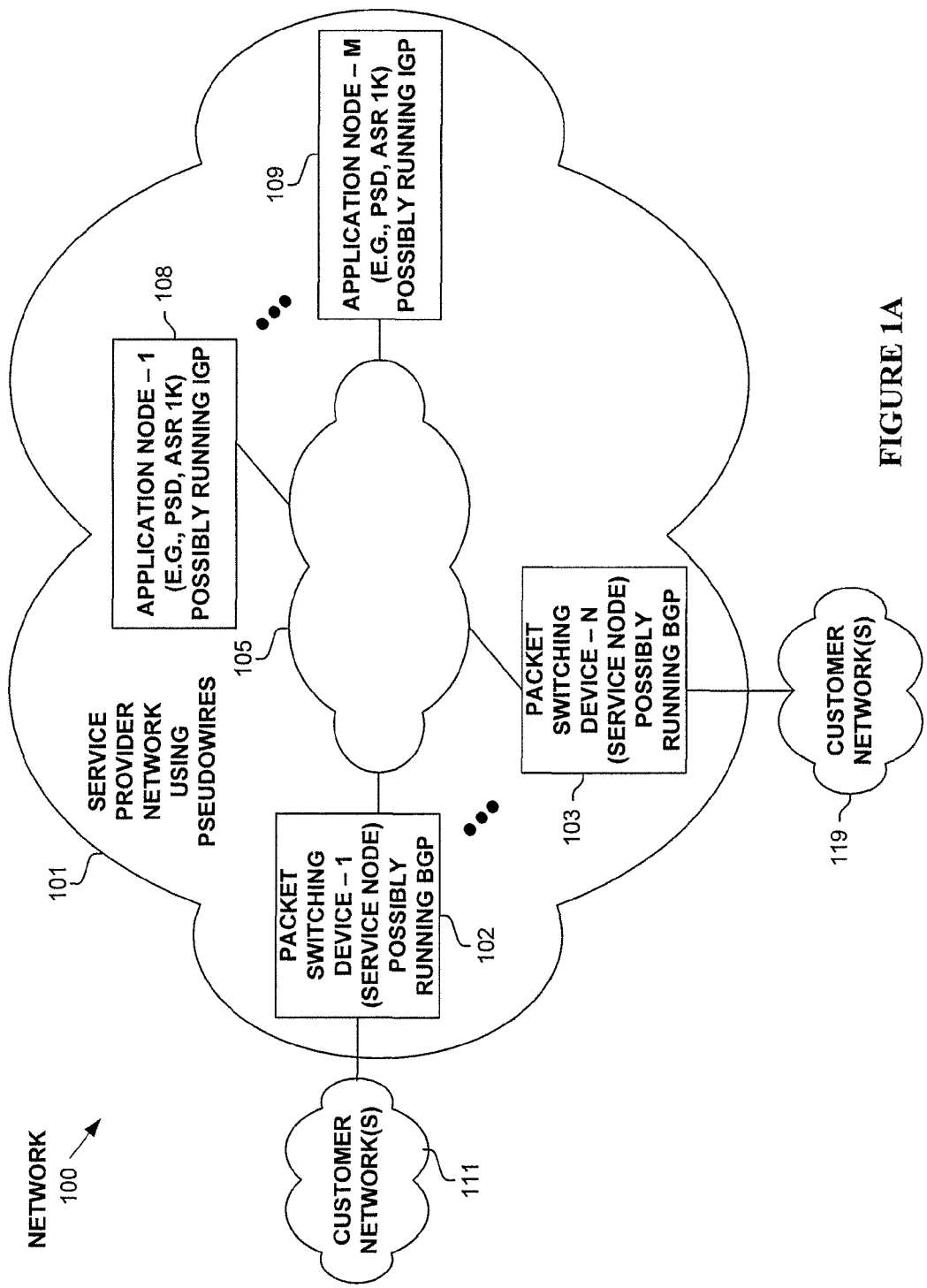
FIG. 1A illustrates a network operating according to one embodiment.

Disclosed are, inter alia, methods, apparatus, computer-storage media, mechanisms, and means associated with and using data path processing information included in the pseudowire layer of packets. One embodiment includes a pseudowire packet, typically stored in computer-readable media, and its use. The pseudowire packet includes data path processing information, included in the pseudowire layer, for use in the data path processing of data (e.g., a packet), typically, but not always, included in the pseudowire packet itself.

In one embodiment, the pseudowire packet includes in corresponding fields: a pseudowire label for identifying a pseudowire, which identifies a pseudowire type; a pseudowire control word; and payload data. The pseudowire type identifies the structure of the pseudowire control word field and the payload field, including the location of data path meta data in the pseudowire packet (e.g., in the pseudowire control word field, payload field, or elsewhere); wherein said data path meta data identifies one or more attributes for use in processing said payload data.

In one embodiment, the data path meta data is located in the pseudowire control word field. In one embodiment, the data path meta data includes an identification of a context for processing of said payload data. In one embodiment, the context includes an identification of a virtual private network (VPN). In one embodiment, the context includes an identification of a service to apply to a packet included in said payload data. In one embodiment, the context includes forwarding information for use in forwarding the packet after the service(s) are applied to the packet. In one embodiment, the identification of the context includes one or more type-length-values (TLVs). In one embodiment, the pseudowire packet includes: a packet switched network label field for storing a packet switched network label for use in communicating the pseudowire packet in the network. In one embodiment, the pseudowire type identifies that the data path meta data is located in the pseudowire control word field.

In one embodiment, the pseudowire packet is used to communicate a packet (e.g., an IP packet in the payload of the pseudowire packet) from a node to an application node for applying one or more L4-L7 services to the packet. The data path meta data carried in the pseudowire layer of the pseudowire packet includes information for use in processing the packet. In one embodiment, this data path meta data identifies: one or more services to apply to the packet; a virtual private network (VPN) associated with the packet; a destination to which to forward the packet after the service(s) have been applied, and/or other information used in the data path processing of the packet.

2. Description

Disclosed are, inter alia, methods, apparatus, computer-storage media, mechanisms, and means associated with and using data path processing information included in the pseudowire layer of packets. One embodiment includes a pseudowire packet, typically stored in computer-readable media, and its use. The pseudowire packet includes data path processing information, included in the pseudowire layer, for use in the data path processing of data (e.g., a packet), typically, but not always, included in the pseudowire packet itself.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device. The term "packet" refers to a data packet or frame, such as, but not limited to, an Internet Protocol (IP) packet or Ethernet frame; and the format of a packet includes at least a packet header and payload.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Disclosed are, inter alia, methods, apparatus, computer-storage media, mechanisms, and means associated with and using data path processing information included in the pseudowire layer of packets. One embodiment includes a pseudowire packet, typically stored in computer-readable media, and its use. The pseudowire packet includes data path processing information, included in the pseudowire layer, for use in the data path processing of data (e.g., a packet), typically, but not always, included in the pseudowire packet itself.

In one embodiment, the pseudowire packet includes in corresponding fields: a pseudowire label for identifying a pseudowire, which identifies a pseudowire type; a pseudowire control word; and payload data. Thus, the pseudowire label identifies the pseudowire type, albeit typically indirectly. The pseudowire type identifies the structure of the pseudowire control word field and the payload field, including the location of data path meta data in the pseudowire packet (e.g., in the pseudowire control word field, payload field, or elsewhere such as, but not limited to, between the pseudowire control word and payload fields). The data path meta data identifies one or more attributes for use in processing said payload data. This new packet structure has advantages as it allows the identification of the location and retrieval of the data path meta data by the pseudowire layer processing performed in one embodiment. Thus, the pseudowire layer processing can use the data path meta data in processing of the packet (e.g., where to forward or how to otherwise process).

In one embodiment, the data path meta data is located in the pseudowire control word field. In one embodiment, the data path meta data includes an identification of a context for processing of said payload data. In one embodiment, the context includes an identification of a virtual private network (VPN). In one embodiment, the context includes an identification of a service to apply to a packet included in said payload data. In one embodiment, the context includes forwarding information for use in forwarding the packet after the service(s) are applied to the packet. In one embodiment, the identification of the context includes one or more type-length-values (TLVs). In one embodiment, the pseudowire packet includes: a packet switched network label field for storing a packet switched network label for use in communicating the pseudowire packet in the network. In one embodiment, the pseudowire type identifies that the data path meta data is located in the pseudowire control word field.

In one embodiment, the pseudowire packet is used to communicate a packet (e.g., an IP packet in the payload of the pseudowire packet) from a node to an application node for applying one or more L4-L7 services to the packet. The data path meta data of the pseudowire layer of the pseudowire packet includes information for use in processing the packet. In one embodiment, this data path meta data identifies: one or more services to apply to the packet; a virtual private network (VPN) associated with the packet; a destination to which to forward the packet after the service(s) have been applied, and/or other information used in the data path processing of the packet.

Examples of these services applied to packets in one embodiment include at least one application from a group of applications consisting of: layer-4, layer-5, layer-6, and layer-7 services. In one embodiment, the service includes at least one application from a group of applications consisting of: Firewall (FW), Network Address Translation (NAT), Network-based Application Recognition (NBAR), deep packet inspection (DPI), authentication, encryption, and Internet Protocol Security (IPsec). In one embodiment, a service might include multiple services/applications applied by one or more application nodes (which may be referred to as a single service including multiple services/applications, or multiple services/applications). Additionally, in one embodiment, a service node, or application node as part of a service which includes multiple applications/services applied by multiple application nodes, might provide parameters or attributes to refine the service being advertised, with these parameters or attributes possibly being communicated to an application node prior to applying a service to a packet, or possibly included with the packet to which the service is to be applied. For example, a generalized deep packet inspection service will need to be configured for what pattern or signature to locate. In one embodiment, an application node might advertise a specific service which may not require such parameters or arguments; for example, a deep packet inspection service configured to look for a predefined, particular pattern or signature.

Note, a particular packet having one or more services applied to it by an application node is referred to herein as a services-applied packet, regardless of whether the application of the service(s) resulted in the same particular packet, a modified particular packet, or a different packet. Further, "ServiceWire" is a term used herein to refer to the technology (e.g., equipment, methods, protocols) used in communicating packets to and/or among one or more remote application node(s), the application of one or more services to a packet, and possibly the sending of the services-applied packet and/or other results to a ServiceWire-capable service node. For example, the packet encapsulation or information sent between service node(s) and/or application node(s) might be referred to as ServiceWire encapsulation or ServiceWire attributes. Further, the singular use of the term "service" typically refers to one or more services. For example, a service to be applied to a packet can be defined to include multiple L4-L7 services to be applied to a packet by one or more application nodes. Additionally, when a particular packet is referred to as included in a pseudowire packet, this phrase means that at least a portion of the particular packet is included in the pseudowire packet, as it may take multiple pseudowire packets to transport a large IP packet (e.g., due to the limited size of the payload data of a pseudowire packet).

One embodiment includes operations performed by a network node, with these operations including receiving a pseudowire packet from another node communicatively coupled to the node via a network, with the pseudowire packet including: a pseudowire type, a pseudowire control word, and payload data; identifying, by the node based on a packet format identified by the pseudowire type, data path meta data identifying one or more attributes; and processing said payload data based on said identified one or more attributes. In one embodiment, the data path meta data is located in the pseudowire control word field. In one embodiment, the data path meta data includes one or more type-length-values (TLVs). In one embodiment, the data path meta data includes an identification of a context for processing of said payload data. In one embodiment, the context includes an identification of a service to apply to a packet included in said payload data; and wherein said processing said payload data based on said identified one or more attributes includes applying the service to the packet included in said payload data. In one embodiment, the context includes forwarding information for use in forwarding the packet after the service is applied to the packet; wherein said applying the service to the packet included in said payload data results in a service-applied packet; and wherein said method includes sending the service-applied packet from the node based on said forwarding information included in the context. In one embodiment, said forwarding information includes a specified next hop node; and wherein said sending the service-applied packet from the node includes sending the service-applied packet to the specified next hop node. In one embodiment, the data path meta data is located in the pseudowire control word field. In one embodiment, the data path meta data includes one or more type-length-values (TLVs).

One embodiment includes a network node, comprising: an interface configured for receiving packets, including a pseudowire packet from another node communicatively coupled to the network node via a network, with the pseudowire packet including: a pseudowire type, a pseudowire control word, and payload data; and one or more processing elements configured: to identify based on a packet format identified by the pseudowire type, data path meta data identifying one or more attributes. In one embodiment, the network node is configured to apply a service to a packet included in said payload data based on said identified one or more attributes. In one embodiment, said data path meta data includes an identification of the service to apply to the packet included in said payload data.

One embodiment includes a method performed by a first node, with the method including: creating, by the first node, a pseudowire packet, with the pseudowire packet including: a pseudowire label for identifying a pseudowire, which identifies a pseudowire type; a pseudowire control word; and payload data; wherein the pseudowire type identifies the structure of the pseudowire control word and the payload, including the location of data path meta data in the pseudowire control word or payload; wherein said data path meta data identifies one or more attributes for use in processing said payload data by a different node communicatively coupled to the first node; and sending the pseudowire packet over a pseudowire conduit toward the different node. One embodiment includes: determining to apply a service to a packet; and encoding in said data path meta data an identification of the service. In one embodiment, the pseudowire type identifies that the data path meta data is located in the pseudowire control word.

One embodiment includes a network node, comprising: an interface configured for sending packets, including a pseudowire packet to another node communicatively coupled to the network node via a network, with the pseudowire packet; and one or more processing elements configured to create the pseudowire packet, including: a pseudowire type, a pseudowire control word, and payload data. Additionally, as identified by the pseudowire type, the pseudowire packet includes data path meta data identifying one or more attributes for use in processing the payload data. In one embodiment, this data path meta data identifies to apply a service to a packet included in said payload data based on said identified one or more attributes.

Expressly turning to the figures, FIG. 1A illustrates network 100 operating according to one embodiment, wherein some of network nodes 102-103 and 108-109 are communicatively coupled via a pseudowire. In one embodiment, a network node 102-103 and 108-109 creates a pseudowire packet including data path processing information included in the pseudowire layer of the pseudowire packet. In one embodiment, a network node 102-103 and 108-109 receives a pseudowire packet including data path processing information included in the pseudowire layer of the pseudowire packet, and processes data (e.g., typically at least partially included in the payload of the pseudowire packet) based on this data path processing information.

Note, known prior systems do not include data plane processing information in the pseudowire layer of a pseudowire packet, nor pass this included data plane processing information to another layer and/or processing component for adjusting the processing of data included in the pseudowire packet.

Additionally, a known prior node terminating a pseudowire strips and discards the pseudowire information from the pseudowire packet, and thus does not provide any information from the pseudowire layer for data layer processing of the payload of the pseudowire packet. Note, none of pseudowire layer sequence numbers, type of packet, and type of adaptation layer provides any data path processing information for data path processing of data included in a pseudowire packet. Rather, this information is used by the pseudowire layer to perform its functionality, including to pass the transported information (e.g., packet) to a next layer and/or processing component. Further, network status information included in a control word is not data path processing information for use in data processing of data included in a pseudowire packet.

In one embodiment, a pseudowire packet is used as a transport vehicle for communicating packets between a service node and one or more application nodes for applying one or more services to a packet. Network 100 illustrates a typical configuration of a service provider network 101, which has edge packet switching devices 102-103 communicatively coupled to customer networks 111-119; and within service provider network 101, service provider nodes 102-103 and 108-109 are communicatively coupled (105). Note, one embodiment performs the operations of sending packets to application node(s) for applying service(s) in one or more networks different than network 100; and one embodiment performs the operations of receiving packets by application node(s) for applying service(s) in one or more networks different than network 100.

In one embodiment, packet switching devices 102-103 ("service nodes") are configured for sending packets to one or more application nodes 108-109 for applying one or more discovered services to these packets. Thus, in one embodiment, packet switching devices 102-103 are not required to be able to perform such service(s). This allows the development of new packet services which are performed by an application node 108-109, without having to integrate into a packet switching device 102-103 (which would typically be more costly in terms of development and testing). Examples of these services applied to packets in one embodiment include layer-4, layer-5, layer-6, and/or layer-7 services, such as, but not limited to, Firewall (FW), Network Address Translation (NAT), Network-based Application Recognition (NBAR), deep packet inspection (DPI), authentication, encryption, and Internet Protocol Security (IPsec). In one embodiment, a packet that has had services applied to it by an application node 108-109 is returned to the service node 102-103 that originally sent the packet to the application node 108-109.

Further, it is possible for an application node (108-109) to apply services to one or more of the packets in a packet flow in order to generate a result, with this result then used by a packet switching device (102-103) in processing these and/or other packets in the packet flow. Thus, in one embodiment, only one or possibly a few packets of a flow (e.g., some, but not all packets) are sent to an application node (108-109) to generate a result or results, with these result(s) used in processing other packets in the packet flow.

In one embodiment, the services applied to a packet include a classification service to classify the packet, possibly using deep packet inspection (DPI), such as, but not limited to, analyzing the payload of the particular packet, and/or analyzing information, extracted from the packet, corresponding to at least one or more of Open System Interconnect (OSI) layer from the group consisting of layer 5, layer 6 and layer 7. In one embodiment, this classification result is used in processing other packets in a flow of packets to which the classified packet belongs. In one embodiment, this classification or other processing result is used in applying Quality of Service (QoS) to one or more packets of the corresponding packet flow.

In one embodiment, packet switching devices 102-103 typically run an exterior network protocol (e.g., Border Gateway Protocol) for accumulating forwarding information for packets. In one embodiment, before sending a request packet to one or more application nodes 108-109 for applying one or more services, a packet switching device 102-103 will perform a lookup operation on this forwarding information for the destination address of the packet to determine where it should be forwarded, with this information included in the request packet. Thus, an application node 108-109 does not need to run BGP, for example, as it will only need to know how to forward packets within network 100 (e.g., a service provider network). In one embodiment, application nodes 108-109 run an Interior Gateway Protocol (IGP), such as, but not limited to Intermediate System to Intermediate System (IS-IS) or Open Shortest Path First (OSPF) to acquire this information. In one embodiment, none or at least one of application nodes 108-109 does not run BGP nor some other external network protocol.

Figure 1B:
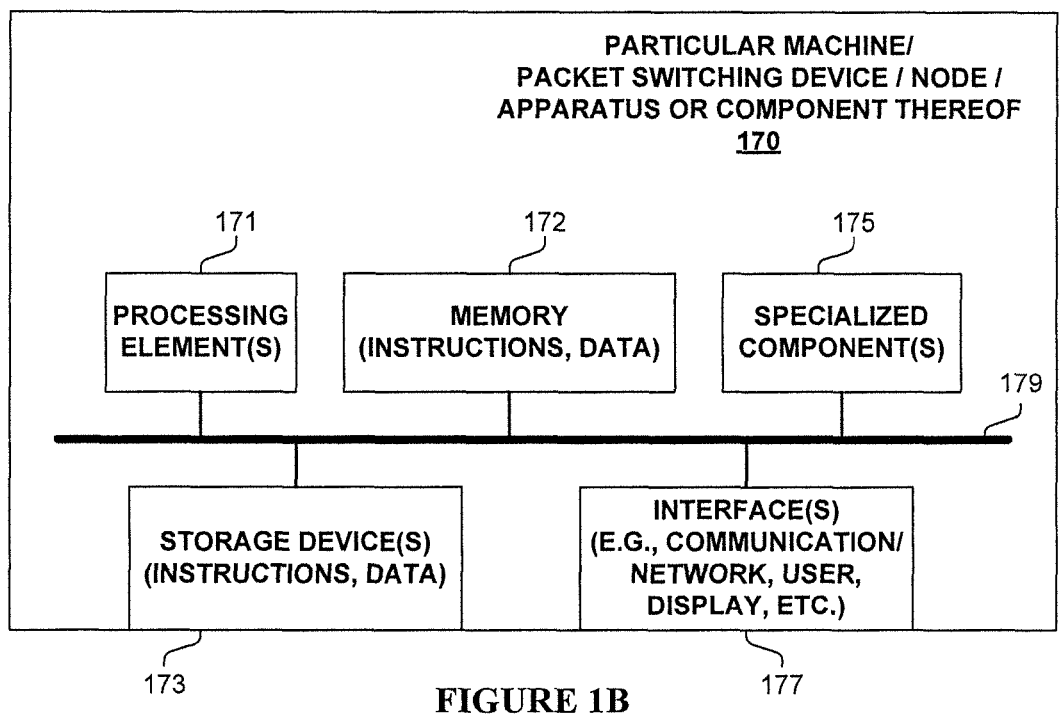
FIG. 1B illustrates an apparatus or component used in one embodiment.

FIG. 1B is a block diagram of a particular machine or apparatus (e.g., packet switching device such as a Cisco ASR 1000 or other router, node, service or application node) or component 170 used in one embodiment. In one embodiment, apparatus or component 170 performs one or more processes corresponding to one of the flow diagrams illustrated or otherwise described herein.

In one embodiment, apparatus or component 170 includes one or more processing element(s) 171, memory 172, storage device(s) 173, specialized component(s) 175 (e.g., optimized hardware such as for performing operations, etc.), and interface(s) 177 for communicating information (e.g., sending and receiving packets, user-interfaces, displaying information, etc.), which are typically communicatively coupled via one or more communications mechanisms 179 (e.g., bus, switch fabric, TDM switch, etc.), with the communications paths typically tailored to meet the needs of the application. In one embodiment apparatus or component 170 corresponds to, or is part of, a service or application node illustrated in one of the other figures or otherwise described herein.

Various embodiments of apparatus or component 170 may include more or less elements. The operation of apparatus or component 170 is typically controlled by processing element(s) 171 using memory 172 and storage device(s) 173 to perform one or more tasks or processes. Memory 172 is one type of computer-readable/computer-storage medium, and typically comprises random access memory (RAM), read only memory (ROM), flash memory, integrated circuits, and/or other memory components. Memory 172 typically stores computer-executable instructions to be executed by processing element(s) 171 and/or data which is manipulated by processing element(s) 171 for implementing functionality in accordance with an embodiment. Storage device(s) 173 are another type of computer-readable medium, and typically comprise solid state storage media, disk drives, diskettes, networked services, tape drives, and other storage devices. Storage device(s) 173 typically store computer-executable instructions to be executed by processing element(s) 171 and/or data which is manipulated by processing element(s) 171 for implementing functionality in accordance with an embodiment.

Figure 2A:
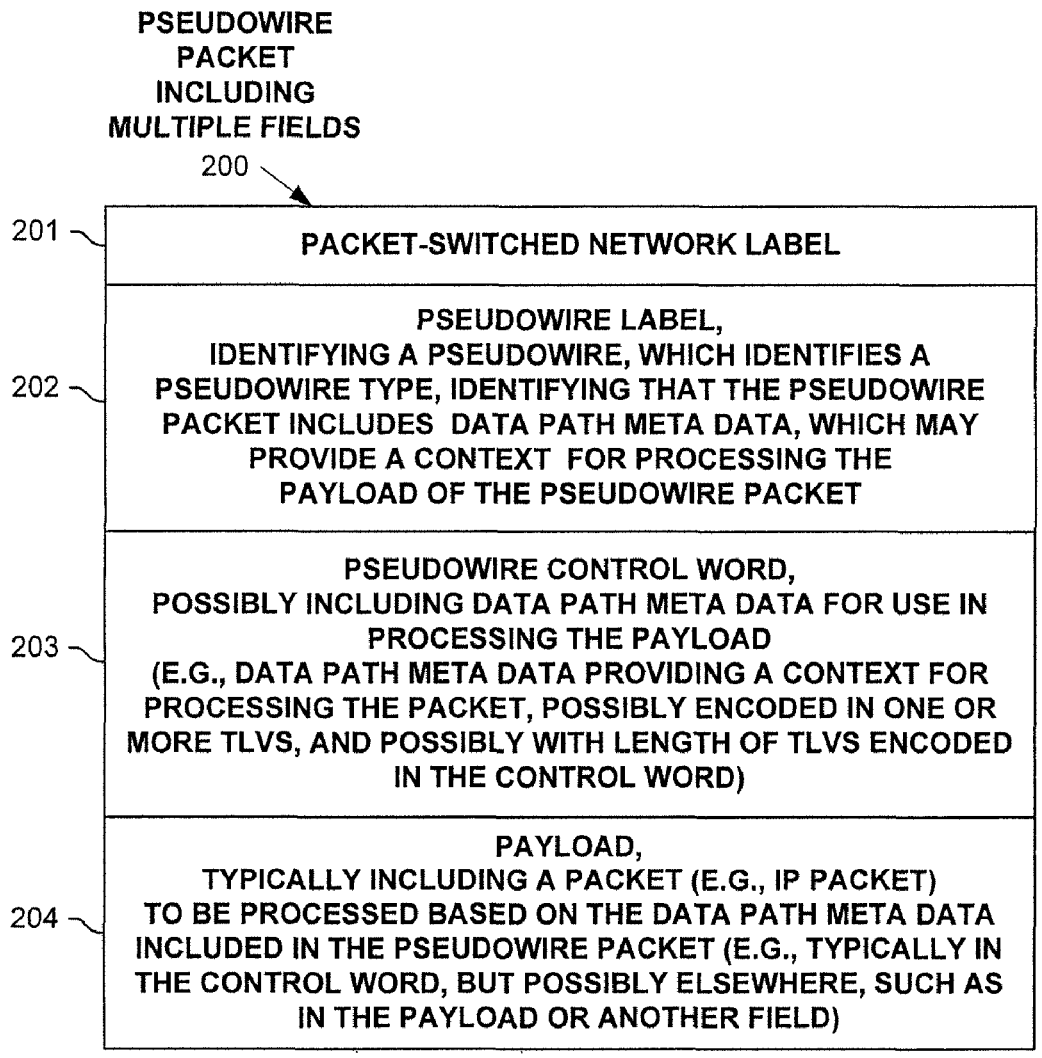
FIG. 2A illustrates a packet format used in one embodiment.

FIG. 2A illustrates a pseudowire packet 200 including multiple fields populated by values. As shown, the fields of the pseudowire packet 200 include:

a packet-switched network (PSN) label 201 used for communicating pseudowire packet 200 through a label-switched network;

a pseudowire label 202 identifying a pseudowire which identifies a pseudowire type, from which the location of data path meta data, among other data items, can be determined;

a pseudowire control word 203 possibly including the data path meta data; and payload 204 typically including a packet (i.e., a complete or partial packet), and may possibly include data path meta data.

In one embodiment, pseudowire packet 200 includes one or more additional fields, which may include the data path meta data. In one embodiment, pseudowire control word 203 includes a length of the data path meta data included in pseudowire packet 200. In one embodiment, this length (e.g., the number of 32-bit units) is encoded in the second-half of the first byte of pseudowire control word 203. (Note, these bits 4-7 are typically used as flags for indicating network failures.) In one embodiment, this data path meta data is included in pseudowire control word 203. In one embodiment, the length of the data path meta data is included in pseudowire control word 203 (e.g., as part of the pseudowire layer), wherein the data path meta data, itself, is included in payload 204 (not considered part of the pseudowire layer). Note, the pseudowire type identified by pseudowire corresponding to pseudowire label 202 is considered part of the pseudowire layer. Thus, a pseudowire type identifying where the data path meta data is located in pseudowire packet 200 (whether in pseudowire control word 203, payload 204, or elsewhere) is considered part of the pseudowire layer.

By allowing the pseudowire layer to at least identify the location of the data path meta data (e.g., based on the pseudowire type and the structure/format of the correspondingly defined packet), the data path meta data can be used in processing the packet. For example, if this data path meta data specifies a particular service to be applied to a packet embedded in the payload of the pseudowire packet, it is possible for the pseudowire layer to determine the particular service (especially when the data path meta data is included in the pseudowire control word), so that the terminating pseudowire process can forward to the particular service. For another example, if this data path meta data specifies a virtual private network (VPN) context to process a packet embedded in the payload of the pseudowire packet, it is possible for the pseudowire layer to determine the VPN (especially when the data path meta data is included in the pseudowire control word), so that the terminating pseudowire process can forward to the appropriate process and/or processing element corresponding to the VPN. Note, the data path meta data may include both a specified service, VPN, and/or other data path contextual information. Further note, by the pseudowire type identifying to the terminating pseudowire process that the pseudowire packet includes data path meta data, the terminating process can retrieve this data path meta data from the pseudowire control word, payload, or other field(s) of the pseudowire packet.

Figure 2B:
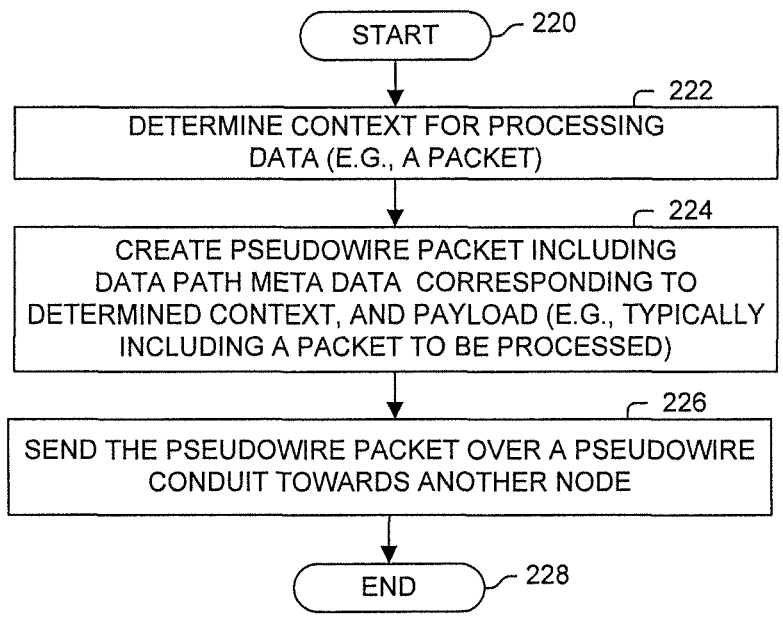
FIG. 2B illustrates a process performed in one embodiment.

FIG. 2B illustrates a process performed in one embodiment. Processing begins with process block 220. In process block 222, a context (e.g., how to process, a VPN in which to process, where to forward after applying a service, etc.) for processing data (e.g. a packet) is determined. In process block 224, a pseudowire packet is created, with the pseudowire packet including data path meta data corresponding to said determined context. In process block 226, the pseudowire packet is sent over a pseudowire conduit towards another node. Processing of the flow diagram of FIG. 2B is complete as indicated by process block 228.

Figure 2C:
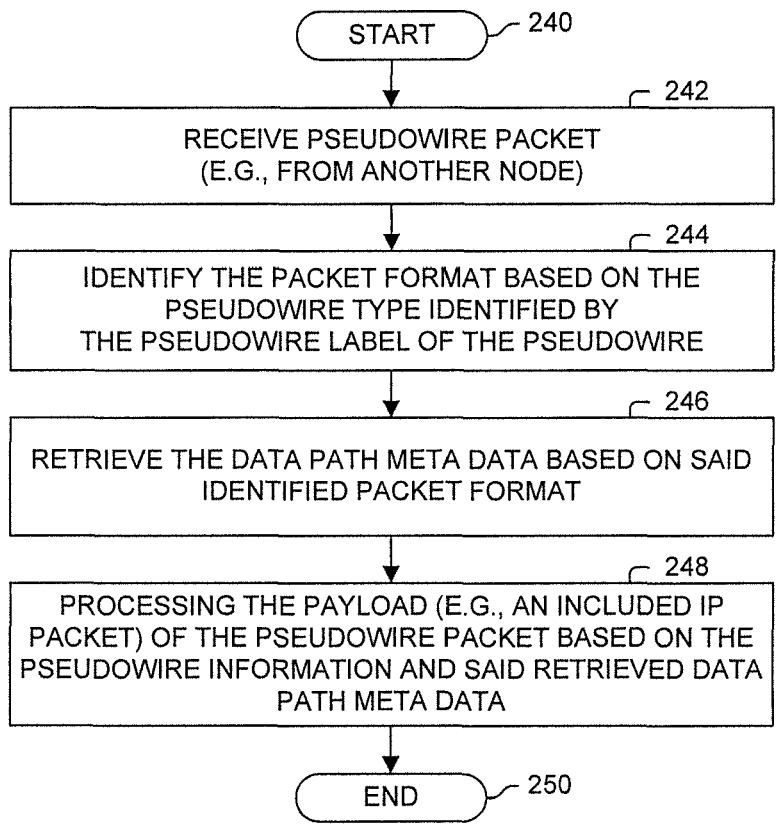
FIG. 2C illustrates a process performed in one embodiment.

FIG. 2C illustrates a process performed in one embodiment. Processing begins with process block 240. In process block 242, a pseudowire packet is received, such as over a pseudowire conduit from another node. In process block 244, the packet format is identifying based on the pseudowire type of the pseudowire identified by the pseudowire label of the pseudowire packet. In process block 246, the data path meta data is retrieved from the pseudowire packet based on the packet format. In process block 248, the payload of the pseudowire packet is processed based on the retrieved data path meta data, and typically also based on the pseudowire information (e.g., according to the context of the pseudowire). Processing of the flow diagram of FIG. 2C is complete as indicated by process block 250.

Figure 3A:
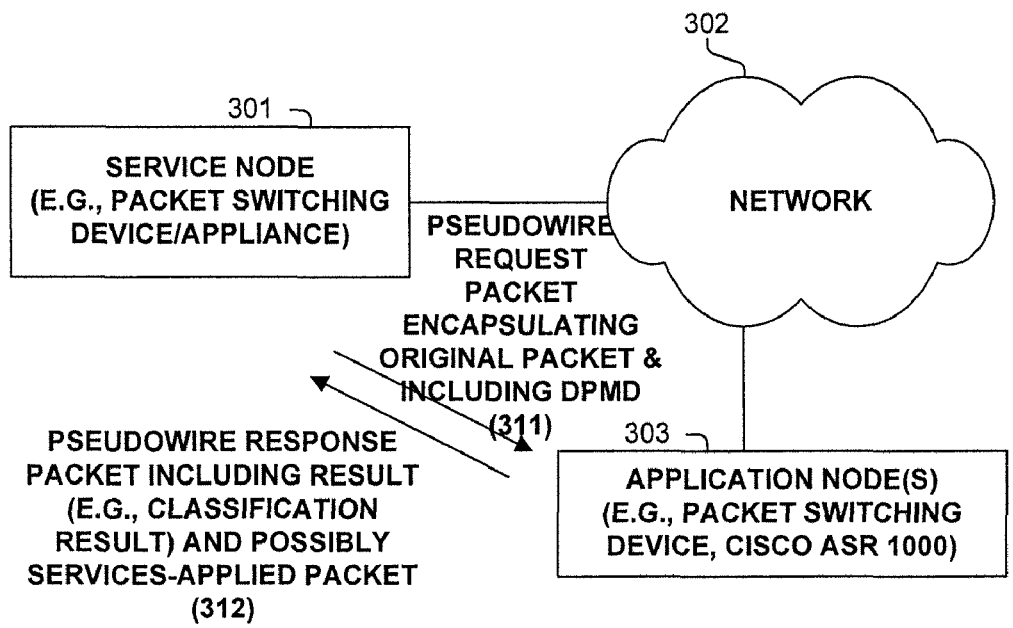
FIG. 3A illustrates a network operating according to one embodiment.

Next, shown in FIG. 3A is a generalized configuration including service node 301 (e.g., packet switching device/appliance), application node(s) 303 (e.g., packet switching device/appliance such as, but not limited to, a Cisco ASR 1000), communicatively coupled via network 302. As shown, service node 301 sends a pseudowire request packet (311) encapsulating an original packet and including data path meta data (DPMD) to application node(s) 303, which applies one or more services to the original packet to determine a result (e.g., classification or other result). A pseudowire response packet is sent (312) from application node(s) 303 to originating service node 301, with the response packet including the determined result, and possibly the encapsulated services-applied packet (e.g., the result of one or more services being applied to the original packet, which is typically the same, or a modification of, the original packet).

Figure 3B:
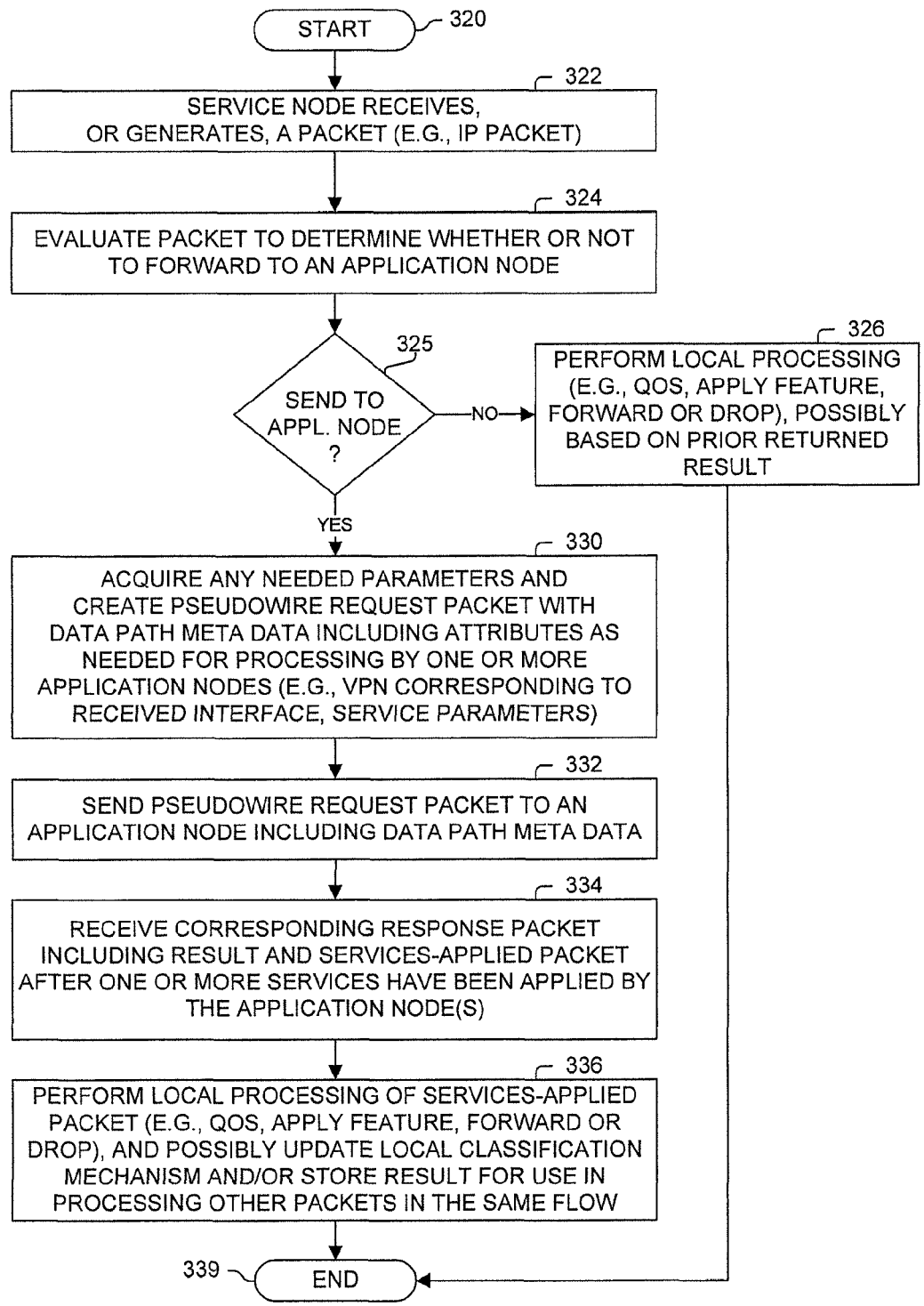
FIG. 3B illustrates a process performed in one embodiment.

FIG. 3B illustrates a process performed in one embodiment by a service node, such as, but not limited to, a packet switching device. Processing begins with process block 320. In process block 322, the service node receives or generates a packet. For example, the packet may be generated by the service node itself, or even by processing of another packet. In process block 324 (assuming it is not already known that the packet should be sent to an application node, e.g., based on a generated packet or all packets being sent to an application node), the packet is evaluated to determine whether or not it should be sent to an application node.

Process block 325 identifies whether or not to send the packet to an application node. In one embodiment, a packet classification mechanism (e.g., binary or ternary content-addressable memory, lookup engine) is used to determine whether or not to forward the packet to an application node. In one embodiment, this classification mechanism is updated in response to a result returned from an application node's processing of another packet in the same packet flow, so that only one or a small number of packets of a flow may be sent to an application node for processing. This may be particularly useful when an application node is performing a classification operation (e.g., for QoS, or even virus or intrusion protection), that after such classification operation is determined for the flow of packets (e.g., based on a subset of the flow of packets), the other packets in the flow of packets are not sent to an application node for processing as how to process these packets has been determined. Thus, the packet classification mechanism may be updated to stop sending packets of the packet flow to an application node.

As identified in process block 325, if the packet should not be sent to an application node, then in process block 326, normal local processing of the packet is performed (e.g., QoS processing, apply one or more features, forward or drop, etc.), possibly based on a result from processing by an application node of one or more packets in a same packet flow.

Otherwise processing proceeds to process block 330, as process block 325 identified that the packet is to be sent to an application node for applying one or more classifications of Layer-4 to Layer-7 services by one or more application nodes to the packet to determine a result. Note, the use of the phrase "applying one or more services to the packet" includes a series of applications applied to the packet, with the packet possibly being modified between the application of some of these services such that one or more of the services is applied to a modified original packet. Further, examples of these Layer-4 to Layer-7 services include, but are not limited to, Firewall (FW), Network Address Translation (NAT), Network-based Application Recognition (NBAR), authentication, encryption and Internet Protocol Security (IPsec).

In process block 330, any parameters (e.g., VPN identification, specialized service parameters, label stacks, etc.) are acquired, and the pseudowire request packet, including the data path meta data is created. The request packet includes the original packet (e.g., the complete or partial packet in the payload of the pseudowire packet), and possibly other ServiceWire attributes (encoded as data path meta data), such as, but not limited to: an identification of one or more services to be applied to the packet, an identification of a virtual private network (VPN) associated with the packet (e.g., a VPN associated with an interface on which the packet was received), etc. In one embodiment, the service identification is a single value, for example, indicating to perform QoS classification on the packet. In one embodiment, the service identification includes the identification of a generalized service (e.g., Firewall) and a specific service of the generalized service (e.g., inside-to-outside, outside-to-inside). Next, in process block 332, the pseudowire request packet (e.g., a ServiceWire packet encapsulating the original packet and including data path meta data) is sent to an application node.

In process block 334, a response packet, corresponding to the sent request packet, is received, with the response packet including a result of the application of one or more services. In one embodiment, this result is a classification result based on one or more classification operations performed on the original packet. Additionally, typically the result packet also encapsulates the services-applied packet corresponding to the original packet (i.e., the result of one or more services being applied to the original packet by one or more application nodes). In process block 336, the service node processes the services-applied packet, typically based on the result (e.g., classification result such as a QoS indication for processing one or more packets of a flow of packets). Examples of such processing include, but are not limited to: the service node applies QoS to one or more packets of a flow of packets, the service node applies one or more additional services to the services-applied packet; the service node forwards or drops the services-applied packet; the service node performs a lookup operation in the corresponding forwarding information for the VPN identified in the response packet from multiple sets of forwarding information maintained for different VPNs; repeat the process illustrated in FIG. 3B by returning to process block 324, etc. Additionally, as discussed supra, the classification mechanism (e.g., the processing by process block 325) might be updated to no longer send packets of a same packet flow to an application node.

Processing of the flow diagram of FIG. 3B is complete as represented by process block 339.

Figure 3C:
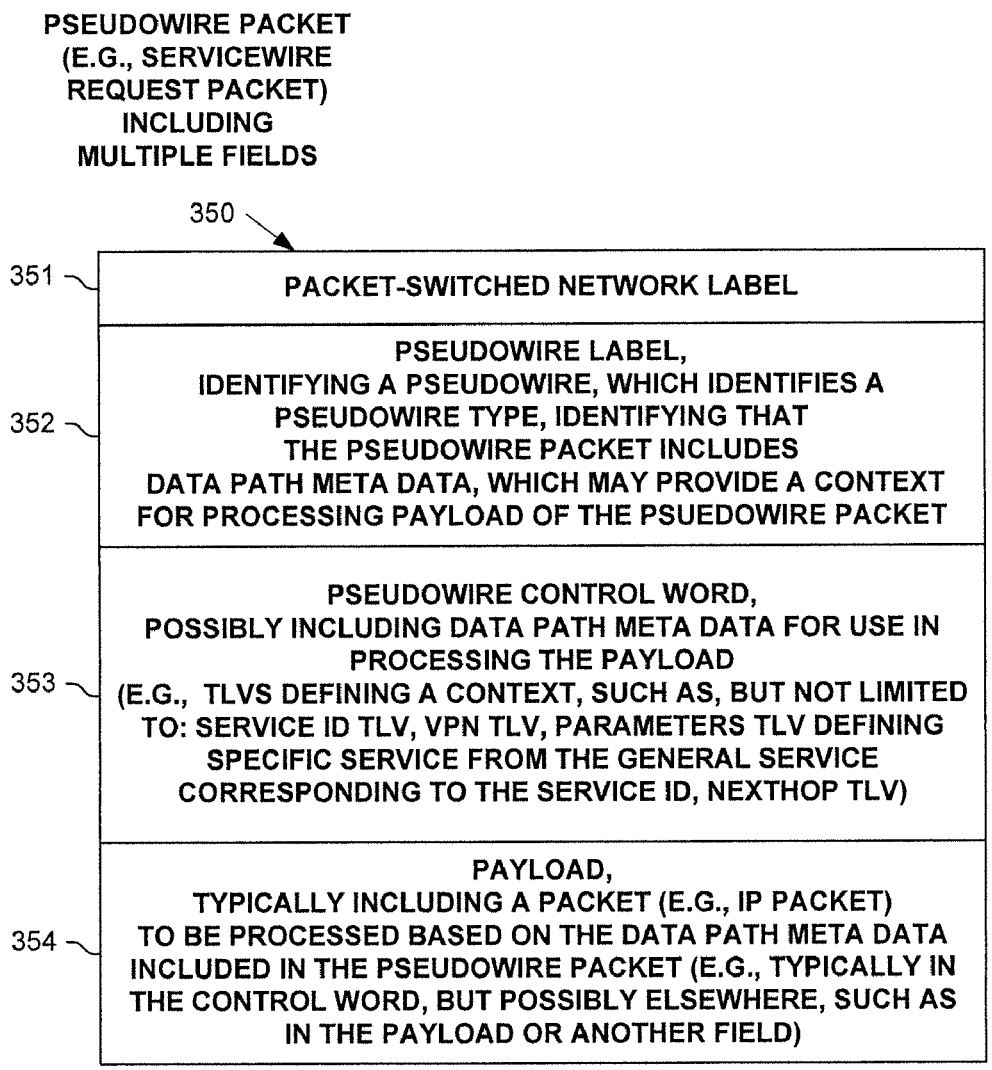
FIG. 3C illustrates a packet format used in one embodiment.

Next, FIG. 3C illustrates a pseudowire ServiceWire request packet (350) used in one embodiment. As shown, request packet 350 encapsulates and stores in payload 354, the original packet, which is to have one or more services applied to it by one or more application nodes. In one embodiment, request packet 350 comprises one or more PSN labels 351, which includes information to get the request packet from the service node to the first application node of one or more application nodes.

Pseudowire label 352 identifies a pseudowire, which identifies a pseudowire type, which is used to identify that the packet, which in one embodiment, is a ServiceWire packet defining the structure of pseudowire control word 353, payload 354 and/or other fields, possibly including data path meta data. For a ServiceWire request packet 350, pseudowire control word 353 typically includes one or more Type-Length-Value (TLV) structures encoding the data path meta data, which includes ServiceWire attributes (e.g., identification of a service, identification of general and specific services, VPN information, etc.). One embodiment encodes the length (e.g., the number of 32-bit units) of these TLVs in the second-half of the first byte of pseudowire control word 353. (Note, these bits 4-7 are typically used as flags for indicating network failures.) In one embodiment, this data path meta data is included in pseudowire control word 353. In one embodiment, the length of the data path meta data is included in pseudowire control word 353 (e.g., as part of the pseudowire layer), wherein the data path meta data, itself, is included in payload 354. Note, an encoding mechanism different than TLVs is used in one embodiment.

Figure 3D:
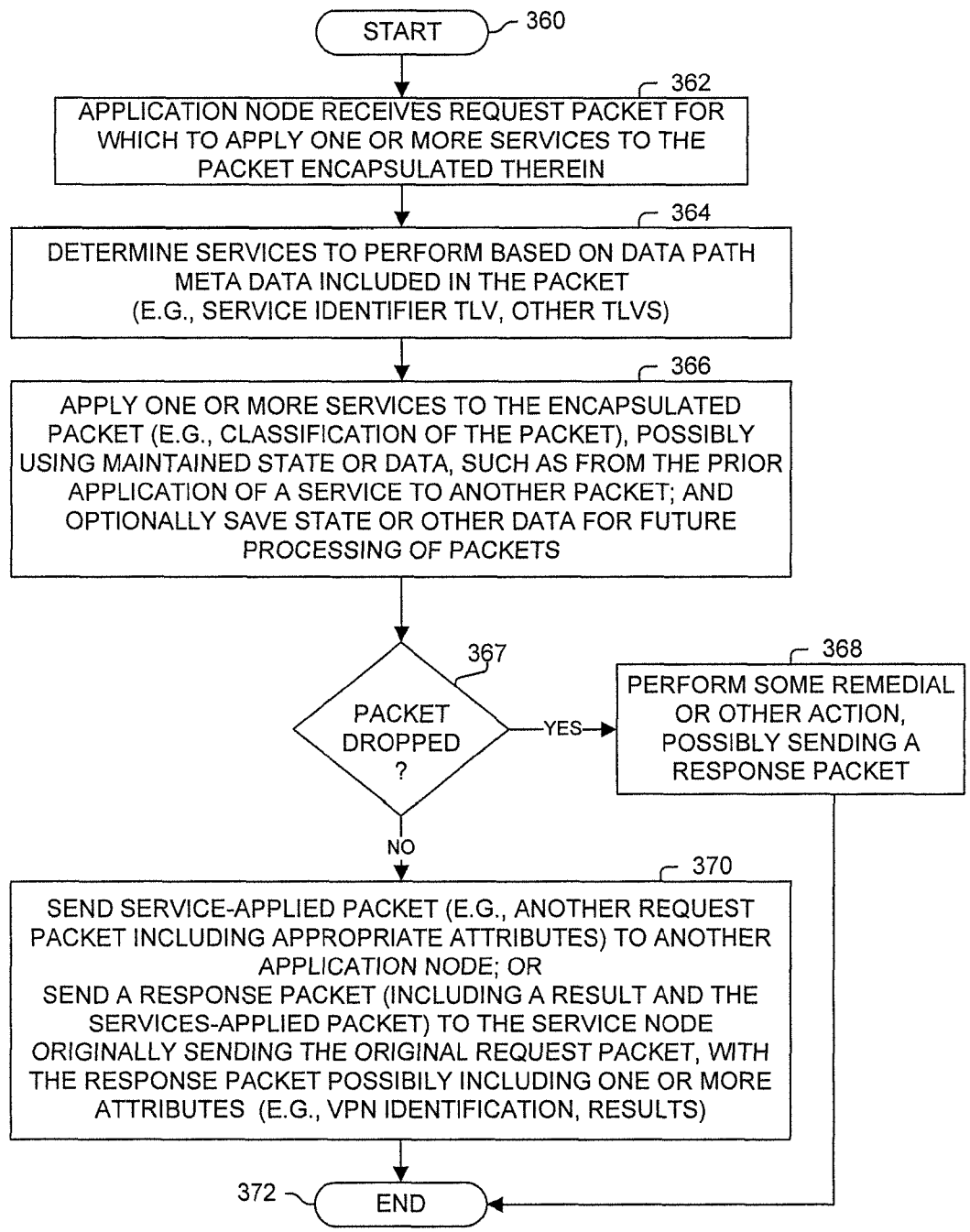
FIG. 3D illustrates a process performed in one embodiment.

FIG. 3D illustrates a process performed, in one embodiment, by an application node for processing a request packet received from a service or application node. Processing begins with process block 360. In process block 362, the application node receives the request packet for which to apply one or more services to the packet encapsulated therein. Typically, the application node is remote from the service node (e.g., communicatively coupled via a network external to the service and application nodes). In one embodiment, the service and application nodes are within a same packet switching appliance, such as with the application node being a blade server. Next, in process block 364, the application node identifies, based on the data path meta data included in the request packet, one or more services to apply to the encapsulated packet in the payload of the pseudowire packet.

In process block 366, the application node applies one or more of the identified service(s) to the encapsulated packet. In one embodiment, these services include a classification service such as using deep packet inspection of the encapsulated packet, generating a classification result which can be used in processing the packet and possibly other packets in the same flow of packets. For example, this classification result might identify a QoS level for processing packets in the flow of packets, or it might identify that the flow of packets should be dropped (e.g., they are malicious in nature).

Additionally, in one embodiment, resulting state information or other data from the application of a service to a packet of a packet flow may be maintained by an application node, such as for use in applying a service to other packets especially those of a same packet flow, or for collecting data or statistics, etc. For example, in analyzing a flow of packets (e.g., applying a deep packet inspection service), certain signature or other data may be split among multiple packets of the packet flow. Thus, to appropriately classify the flow, an analysis/classification service is applied to multiple packets of the flow, with the particular classification of the packet flow not known until the last of these multiple packets have been analyzed. In one embodiment, a service or an application node uses this particular classification to process other packets in the packet flow. Note, these packets, after having one or more services applied to them, can be sent to another application node, to a service node, or dropped.

As determined in process block 367, if the packet was dropped, then in process block 368, some remedial or other action is typically taken, which may include sending a response packet to the service node, such that the service node can update its classification mechanism to no longer forward packets of the corresponding packet flow to an application node, and to update its processing of other packets of the corresponding packet flow (e.g., drop or mark for dropping, or other processing).

Otherwise, in process block 370, the services-applied packet (e.g., the original packet or a modification thereof based on the application of one or more services) is sent in a request packet to another application node (e.g., such as using a process similar to that illustrated in FIG. 3A) to apply one or more services; or the services-applied packet along with a result (e.g., classification or other processing result) is sent in a response packet back to the originating service node. For example, one application node can apply one or more services (e.g., including deep packet inspection) to a packet, with the packet and these results sent to another application node for applying one or more services. The response packet may include one or more attributes or other information, such as, but not limited to, a classification or processing result and/or an identification of a VPN associated with the services-applied packet (e.g., the same or different identifier identifying a VPN in the ServiceWire or other encapsulation of the received request packet).

Processing of the flow diagram of FIG. 3D is complete as indicated by process block 372.

Figure 3E:
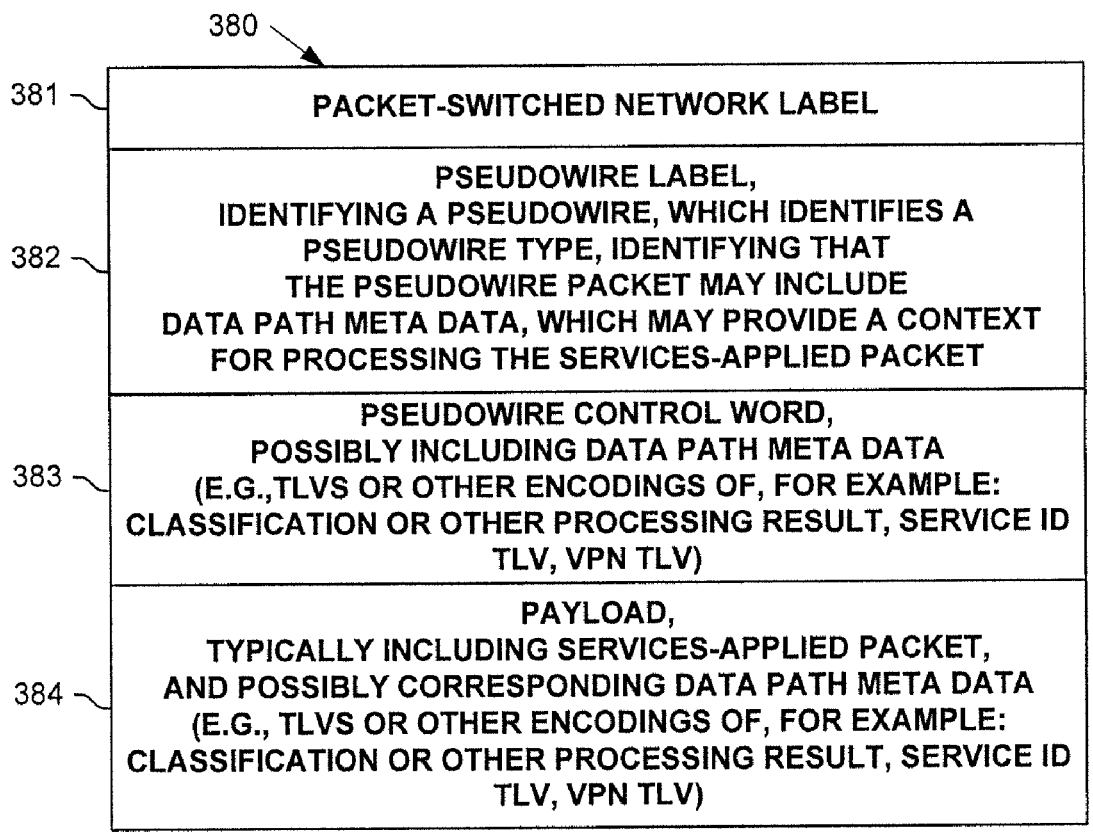
FIG. 3E illustrates a packet format used in one embodiment.

Next, FIG. 3E illustrates a ServiceWire response packet (380) used in one embodiment. As shown, response packet 380 encapsulates the services-applied packet in payload 384, which is the original packet after having the one or more services applied to it by one or more application nodes. Thus, services-applied packet can be the original packet, or a modification thereof resulting from the application of these services.

In one embodiment, response packet 380 includes: one or more PSN labels 381 for getting the response packet from the application node to the service node; a pseudowire label 382; a pseudowire control word 383; and payload 384. In one embodiment, response packet 380 includes one or more other fields, which may include data path meta data.

Pseudowire label 382 identifies a pseudowire, which identifies a pseudowire type, which is used to identify that the packet, in one embodiment, is a ServiceWire packet defining the structure of pseudowire control word 383, payload 384 and/or other fields, possibly including data path meta data. For a ServiceWire response packet 380, pseudowire control word 383 typically includes one or more Type-Length-Value (TLV) structures encoding the data path meta data for use by the receiving service node in processing encapsulated services-applied packet (in payload 384) and/or other packets in a same packet flow (e.g., classification or other processing result, VPN information so the service node can properly forward services-applied packet). One embodiment encodes the length (e.g., the number of 32-bit units) of these TLVs in the second-half of the first byte of pseudowire control word 383. (Note, these bits 4-7 are typically used as flags for indicating network failures.) In one embodiment, this data path meta data is included in pseudowire control word 383. In one embodiment, the length of the data path meta data is included in pseudowire control word 383 (e.g., as part of the pseudowire layer), wherein the data path meta data, itself, is included in payload 384. Note, an encoding mechanism different than TLVs is used in one embodiment.

Figure 4A:
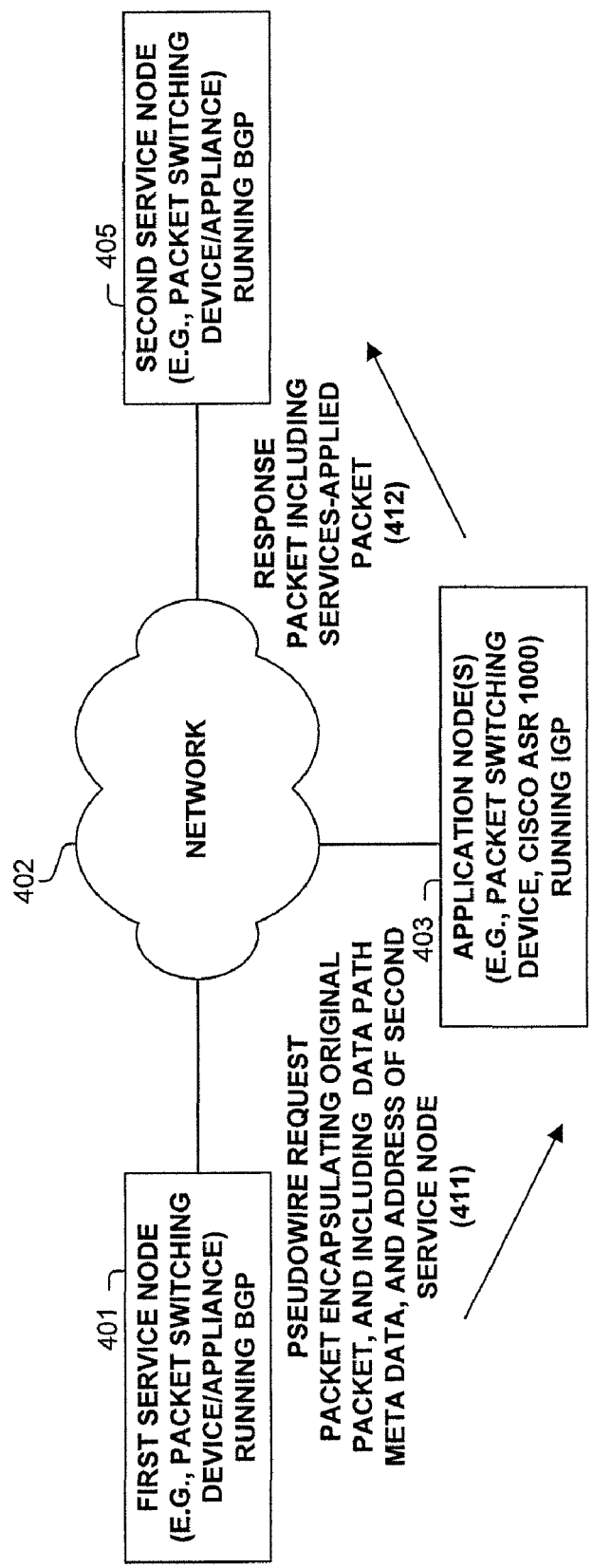
FIG. 4A illustrates a network operating according to one embodiment.

Next, shown in FIG. 4A is a generalized configuration including first and second service nodes 401 and 405 (e.g., packet switching devices/appliances), and application node(s) 403 (e.g., packet switching device/appliance such as, but not limited to, a Cisco ASR 1000), communicatively coupled via network 402. In one embodiment, the second service node 405 is not aware of the use of an application node 403 to apply services.

As shown, first service node 401 runs BGP to determine forwarding information. First service node 401 performs a lookup operation in this forwarding information based on the destination address of a received or generated packet to determine where the packet should be forwarded. In this example, this determined next hop address is that of second service node 405. First service node 401 sends, to application node(s) 403, a pseudowire request packet (411) encapsulating an original packet and including data path meta data (DPMD), which includes an address of second service node 405. Application node(s) 403 applies one or more services to the original packet. A response packet is sent (412) from application node(s) 403 to service node 405 based on the next hop address of service node 405 included in request packet, with the response packet including the encapsulated services-applied packet (e.g., the result of one or more services being applied to the original packet, which is typically the same, or a modification of, the original packet).

Figure 4B:
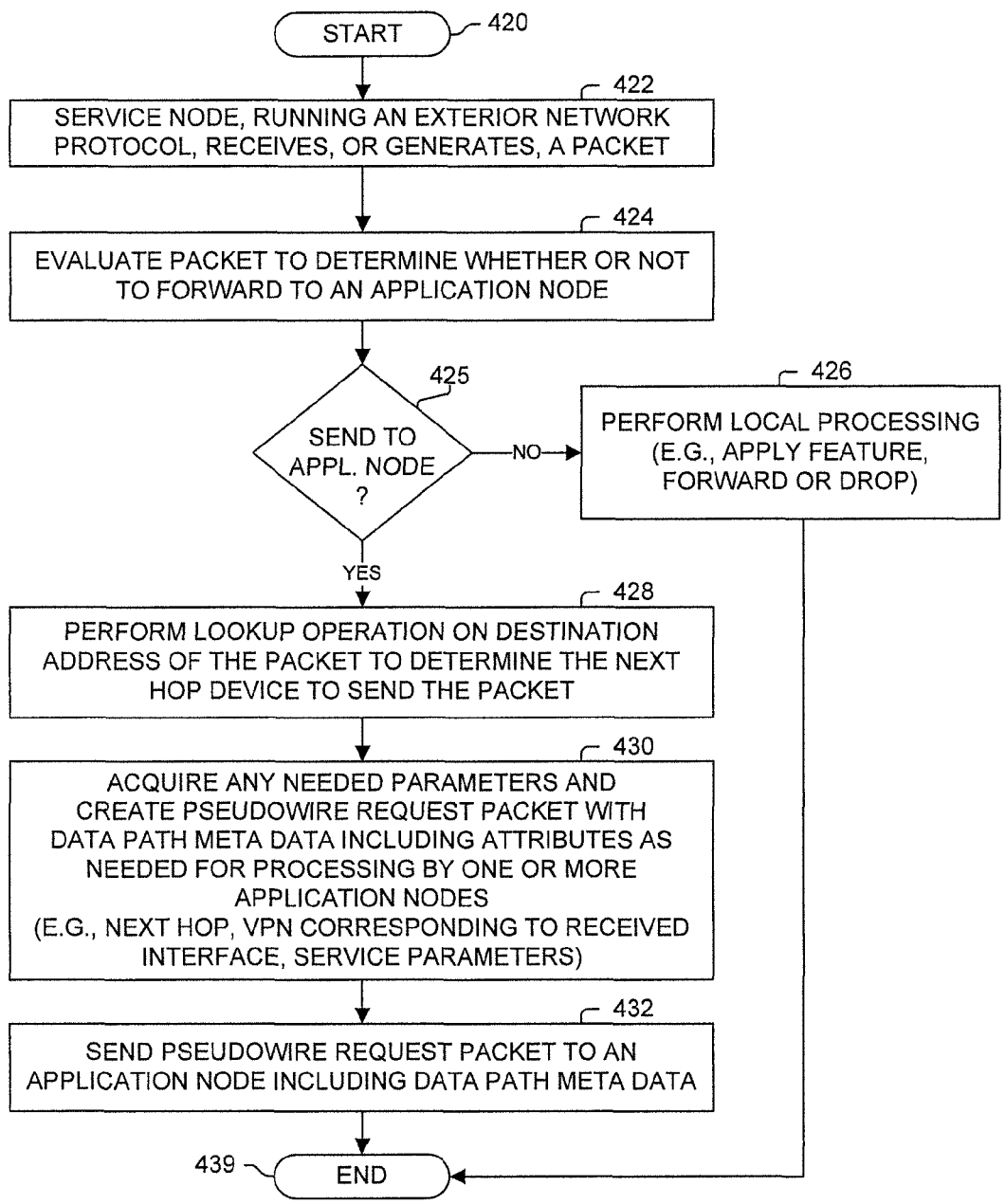
FIG. 4B illustrates a process performed in one embodiment.

FIG. 4B illustrates a process performed in one embodiment by a service node, such as, but not limited to, a packet switching device. Processing begins with process block 420. In process block 422, the service node receives or generates a packet. For example, the packet may be generated by the service node itself, or even by processing of another packet. In addition, this service node runs an exterior network protocol, such as BGP for acquiring forwarding information. In process block 424 (assuming it is not already known that the packet should be sent to an application node, e.g., based on a generated packet or all packets being sent to an application node), the packet is evaluated to determine whether or not it should be sent to an application node. As identified in process block 425, if the packet should not be sent to an application node, then in process block 426, normal local processing of the packet is performed (e.g., apply one or more features, forward or drop, etc.). Otherwise processing proceeds to process block 428, as process block 425 identified that the packet is to be sent to an application node for applying one or more Layer-4 to Layer-7 services by one or more application nodes to the packet.

Note, the use of the phrase "applying one or more services to the packet" includes a series of applications applied to the packet, with the packet possibly being modified between the application of some of these services such that one or more of the services is applied to a modified original packet. Further, examples of these Layer-4 to Layer-7 services include, but are not limited to, Firewall (FW), Network Address Translation (NAT), Network-based Application Recognition (NBAR), authentication, encryption and Internet Protocol Security (IPsec).

In process block 428, a lookup operation is performed in the forwarding information based on a destination address of a packet (e.g., the IP destination address in the IP header of the packet) to determine a next hop address to which the packet should be forwarded. In process block 430, any parameters (e.g., VPN identification, specialized service parameters, label stacks, etc.) are acquired, and the pseudowire request packet, including the data path meta data is created. The request packet includes the original packet (e.g., the complete or partial packet in the payload of the pseudowire packet), and possibly other ServiceWire attributes (encoded as data path meta data), such as, but not limited to: an identification of one or more services to be applied to the packet, an identification of the determined next hop value, an identification of a virtual private network (VPN) associated with the packet (e.g., a VPN associated with an interface on which the packet was received), etc. In one embodiment, the service identification is a single value. In one embodiment, the service identification includes the identification of a generalized service (e.g., Firewall) and a specific service of the generalized service (e.g., inside-to-outside, outside-to-inside). Next, in process block 432, the request packet (e.g., a ServiceWire packet encapsulating the original packet) is sent to an application node. Processing of the flow diagram of FIG. 4B is represented by process block 439.

Figure 4C:
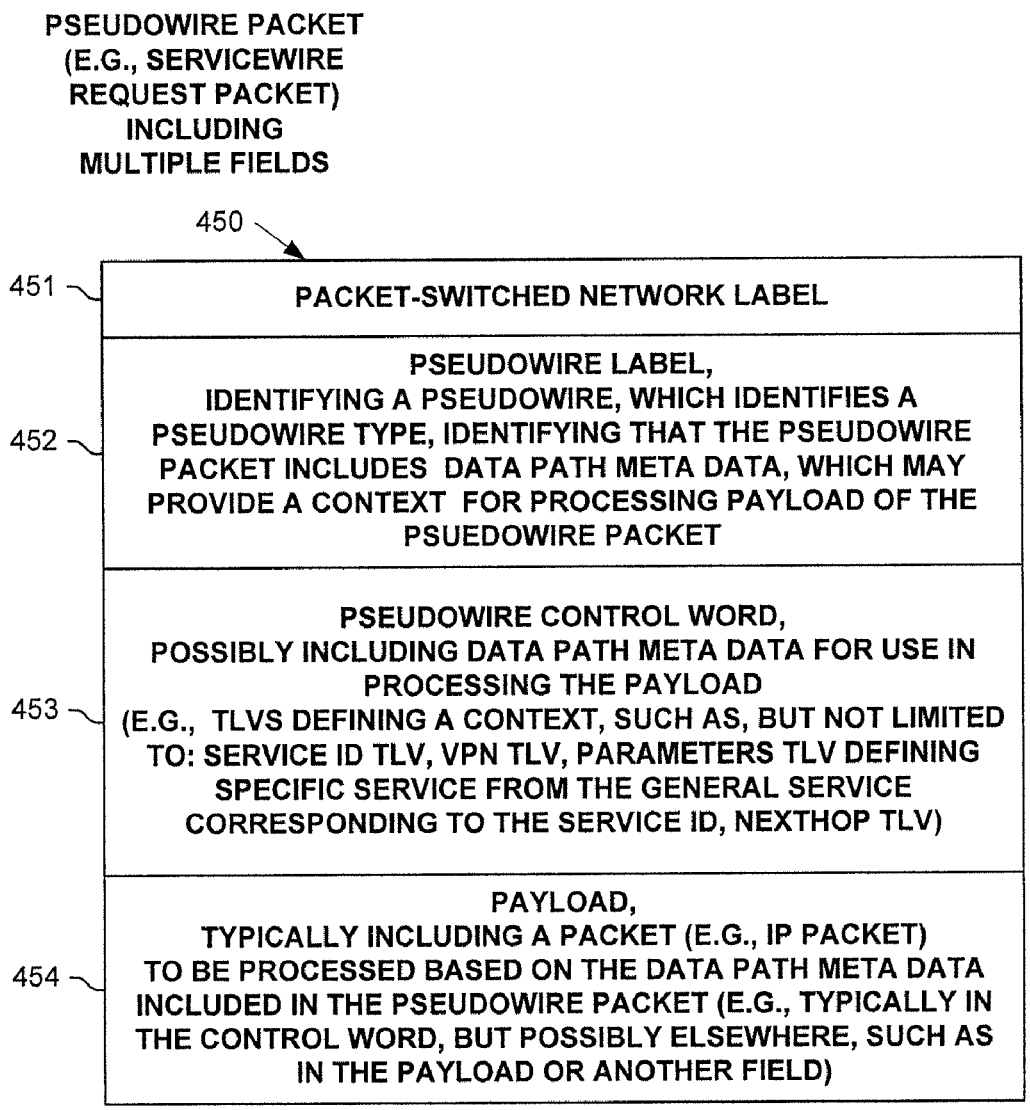
FIG. 4C illustrates a packet format used in one embodiment.

Next, FIG. 4C illustrates a pseudowire ServiceWire request packet (450) used in one embodiment. As shown, request packet 450 encapsulates and stores in payload 454, the original packet, which is to have one or more services applied to it by one or more application nodes. In one embodiment, request packet 450 comprises one or more PSN labels 451, which includes information to get the request packet from the service node to the first application node of one or more application nodes.

Pseudowire label 452 identifies a pseudowire, which identifies a pseudowire type, which is used to identify that the packet, in one embodiment, is a ServiceWire packet defining the structure of pseudowire control word 453 and/or payload 454. For a ServiceWire request packet 450, pseudowire control word 453 typically includes one or more Type-Length-Value (TLV) structures encoding the data path meta data, which includes ServiceWire attributes (e.g., next hop information for where to send the services-applied packet, identification of a service, identification of general and specific services, VPN information, etc.). One embodiment encodes the length (e.g., the number of 32-bit units) of these TLVs in the second-half of the first byte of pseudowire control word 453. (Note, these bits 4-7 are typically used as flags for indicating network failures.) In one embodiment, this data path meta data is included in pseudowire control word 453. In one embodiment, the length of the data path meta data is included in pseudowire control word 453 (e.g., as part of the pseudowire layer), wherein the data path meta data, itself, is included in payload 454. Note, an encoding mechanism different than TLVs is used in one embodiment. In one embodiment, the data path meta data is included in a field other than pseudowire control word 453.

Figure 4D:
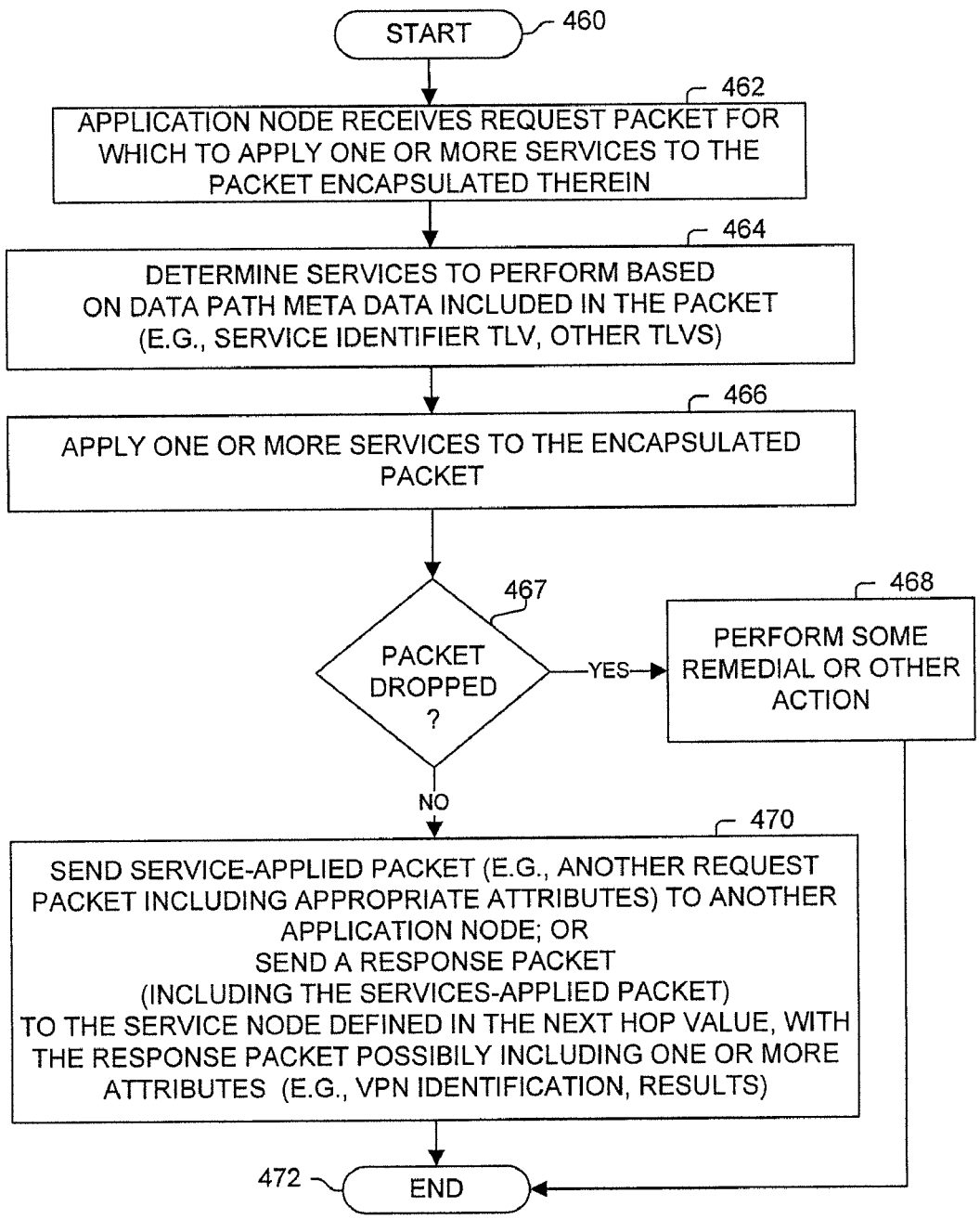
FIG. 4D illustrates a process performed in one embodiment.

FIG. 4D illustrates a process performed, in one embodiment, by an application node. Processing begins with process block 460. In process block 462, the application node receives the pseudowire ServiceWire request packet for which to apply one or more services to the packet encapsulated therein. Typically, the application node is remote from the service node (e.g., communicatively coupled via a network external to the service and application nodes). In one embodiment, the service and application nodes are within a same packet switching appliance, such as with the application node being a blade server.

Next, in process block 464, the application node identifies, based on the data path meta data included in the request packet (e.g., in the pseudowire control word or payload) one or more services to apply to the encapsulated packet. In process block 466, the application node applies one or more of the identified service(s) to the encapsulated packet. As determined in process block 467, if the packet was dropped, then in process block 468, some remedial or other action is typically taken. Otherwise, in process block 470, the services-applied packet (e.g., the original packet or a modification thereof based on the application of one or more services) is sent in a request packet to another application node to apply one or more services; or the services-applied packet is sent to the address identified in a next hop attribute (e.g., the next hop address determined by the requesting service node) encoded in the data path meta data. The response packet may include, in the data path meta data, one or more attributes or other information, such as, but not limited to, an identification of a VPN associated with the services-applied packet (e.g., the same or different identifier identifying a VPN in the ServiceWire or other encapsulation of the received request packet). Processing of the flow diagram of FIG. 4D is complete as indicated by process block 472.

Figure 4E:
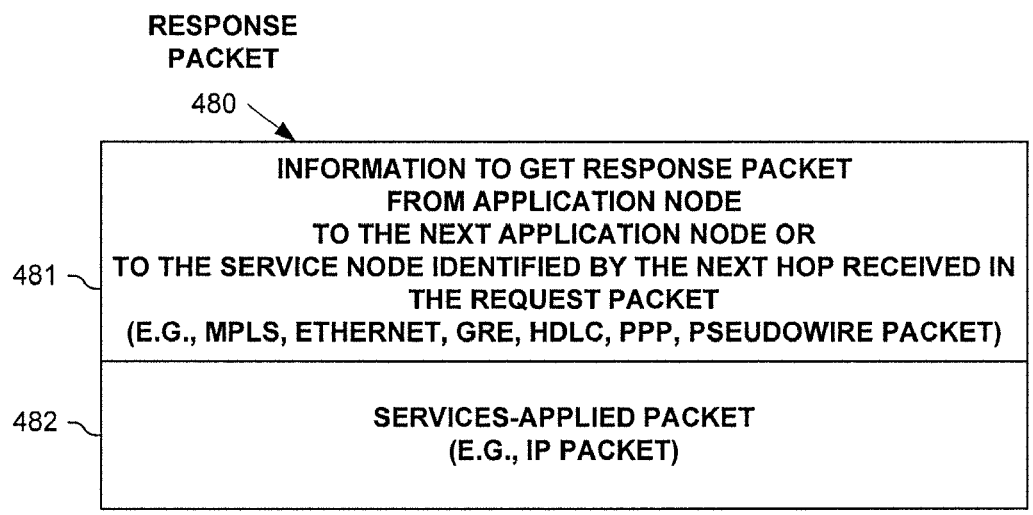
FIG. 4E illustrates a packet format used in one embodiment.

Next, FIG. 4E illustrates a response packet (480) used in one embodiment. In one embodiment, the ServiceWire processing has been completed, so response packet 480 is no longer in the ServiceWire domain, and simply transports the services-applied packet to its original next hop address (e.g., that determined by the initiating service node).

As shown, response packet 480 encapsulates the services-applied packet 482, which is the original packet after having the one or more services applied to it by one or more application nodes. Thus, services-applied packet 482 packet can be the original packet, or a modification thereof resulting from the application of these services. In one embodiment, response packet 480 comprises one or more fields 481, which includes information to get the response packet from the application node to the address identified by the next hop value included in the request packet by the requesting service node. The format of response packet 480 may be in one of an extensible number of formats, such as, but not limited to, MPLS, Ethernet, GRE, HDLC, PPP, pseudowire, etc., with one or more fields 481 conforming to the particular packet format.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. One or more non-transitory computer-readable media for storing data for access by a node coupled to a network, said data comprising:
    a pseudowire packet stored in said computer-readable media, the pseudowire packet stored including:
        a pseudowire label field for storing a pseudowire label for identifying a pseudowire, which identifies a pseudowire type;
        a pseudowire control word field for storing a pseudowire control word; and
        a payload field for storing payload data;
    wherein the pseudowire type identifies a structure of the pseudowire control word field and the payload field, the structure including a location of data path meta data; wherein said data path meta data identifies one or more attributes for use in processing said payload data;

wherein the data path meta data includes an identification of a context for processing of an Internet Protocol (IP) packet included in said payload data; and wherein the context includes an identification of a service for a remote node to apply to the IP packet included in said payload data.

2. The non-transitory computer-readable media of claim 1, wherein the data path meta data is located in the pseudowire control word field.

3. The non-transitory computer-readable media of claim 1, wherein the context includes an identification of a virtual private network (VPN).

4. The non-transitory computer-readable media of claim 1, wherein the context includes forwarding information for use in forwarding the packet after the service is applied to the packet.

5. The non-transitory computer-readable media of claim 1, wherein the identification of the context includes one or more type-length-values (TLVs).

6. The non-transitory computer-readable media of claim 5, wherein the control word includes an identification of one or more lengths of said one or more TLVs.

7. The non-transitory computer-readable media of claim 1, wherein the pseudowire packet includes: a packet switched network label field for storing a packet switched network label for use in communicating the pseudowire packet in the network.

8. The non-transitory computer-readable media of claim 1, wherein the pseudowire type identifies that the data path meta data is located in the pseudowire control word field.

9. The non-transitory computer-readable media of claim 1, wherein the pseudowire type identifies that the data path meta data is located in the payload field.

10. The non-transitory computer-readable media of claim 1, wherein the data path meta data is located in the pseudowire packet, but not in the pseudowire control word field and not in the payload field.

11. A method, comprising:
receiving, by a node, a pseudowire packet from another node communicatively coupled to the node via a network, with the pseudowire packet including: a pseudowire type, a pseudowire control word, and payload data;
identifying, by the node based on a packet format identified by the pseudowire type, data path meta data identifying one or more attributes; and
processing said payload data based on said identified one or more attributes;
wherein the data path meta data includes an identification of a context for processing of said payload data; and
wherein the context includes an identification of a service for a remote node to apply to an Internet Protocol (IP) packet included in said payload data; and wherein said processing said payload data based on said identified one or more attributes includes applying the service to the IP packet included in said payload data.

12. The method of claim 11, wherein the context includes forwarding information for use in forwarding the IP packet after the service is applied to the IP packet; wherein said applying the service to the IP packet included in said payload data results in a service-applied IP packet; and wherein said method includes sending the service-applied IP packet from the node based on said forwarding information included in the context.

13. The method of claim 12, wherein said forwarding information includes a specified next hop node; and wherein said sending the service-applied packet from the node includes sending the service-applied IP packet to the specified next hop node.

14. The method of claim 11, wherein the data path meta data is located in the pseudowire control word field.

15. The method of claim 14, wherein the data path meta data includes one or more type-length-values (TLVs).

16. A network node, comprising:
an interface configured for receiving packets, including a pseudowire packet from another network node communicatively coupled to the network node via a network, with the pseudowire packet including: a pseudowire type, a pseudowire control word, and payload data, wherein the pseudowire type identifies the structure of the pseudowire control word and the payload, including the location of data path meta data in the pseudowire control word or payload; and
one or more processing elements configured: to identify based on a packet format identified by the pseudowire type, the data path meta data identifying one or more attributes; and to apply a service to an Internet Protocol (IP) packet included in said payload data based on said identified one or more attributes.

17. The network node of claim 16, wherein said data path meta data includes an identification of the service to apply to the IP packet included in said payload data.

18. A method, comprising:
determining to apply a service to an Internet Protocol (IP) packet by a different node;
creating, by a first node, a pseudowire packet, with the pseudowire packet including: a pseudowire label for identifying a pseudowire, which identifies a pseudowire type; a pseudowire control word; and payload data; wherein the pseudowire type identifies the structure of the pseudowire control word and the payload, including the location of data path meta data in the pseudowire control word or payload; wherein said data path meta data identifies one or more attributes for use in processing said payload data by the different node communicatively coupled to the first node; wherein the payload data includes the IP packet, and said data path meta data has encoded therein an identification of the service to be applied by the different node; and
sending the pseudowire packet over a pseudowire conduit toward the different node.

19. The method of claim 18, wherein the pseudowire type identifies that the data path meta data is located in the pseudowire control word.

20. A method, comprising:
determining to apply a service to a packet;
creating, by a first node, a pseudowire packet, with the pseudowire packet including: a pseudowire label for identifying a pseudowire, which identifies a pseudowire type; a pseudowire control word; and payload data; wherein the pseudowire type identifies the structure of the pseudowire control word and the payload, including the location of data path meta data in the pseudowire control word or payload; wherein said data path meta data identifies one or more attributes for use in processing said payload data by a different node communicatively coupled to the first node; wherein said creating the pseudowire packet includes encoding in said data path meta data an identification of the service; wherein the pseudowire type identifies that the data path meta data is located in the pseudowire control word; and
sending the pseudowire packet over a pseudowire conduit toward the different node.

* * * * *